United States Patent [19]

Fujino et al.

[11] Patent Number: 4,675,737
[45] Date of Patent: Jun. 23, 1987

[54] SUPERIMPOSING APPARATUS

[75] Inventors: Takuo Fujino, Fujisawa; Noboru Sugie, Atsugi, both of Japan

[73] Assignee: Mitsumi Electric Co., Ltd., Chofu, Japan

[21] Appl. No.: 809,891

[22] Filed: Dec. 17, 1985

[30] Foreign Application Priority Data

Dec. 21, 1984 [JP] Japan .................................. 59-269970

[51] Int. Cl.$^4$ .................. H04N 5/272; H04N 9/74
[52] U.S. Cl. ................................. 358/183; 358/22; 358/146; 340/721
[58] Field of Search .............. 358/183, 22, 142, 146, 358/147; 340/721

[56] References Cited

U.S. PATENT DOCUMENTS

| | | | |
|---|---|---|---|
| 3,786,481 | 1/1974 | Hartman | 358/183 X |
| 3,872,461 | 3/1975 | Jarosik et al. | 340/721 X |
| 3,891,792 | 6/1975 | Kimura | 358/183 X |
| 3,911,420 | 10/1975 | Lampson | 358/183 X |
| 3,993,864 | 11/1976 | Pye et al. | 358/183 |
| 4,203,130 | 5/1980 | Doumit et al. | 358/183 X |
| 4,245,252 | 1/1981 | Nagumo | 358/183 X |
| 4,398,216 | 8/1983 | Field et al. | 358/143 X |
| 4,450,442 | 5/1984 | Tanaka | 340/721 X |
| 4,475,806 | 10/1984 | Daughton et al. | 340/715 X |
| 4,599,611 | 7/1986 | Bowker et al. | 358/22 X |

FOREIGN PATENT DOCUMENTS

| | | | |
|---|---|---|---|
| 2381357 | 10/1978 | France | 340/721 |
| 2389941 | 1/1979 | France | 340/721 |
| 58-81395 | 5/1983 | Japan | 358/146 |

OTHER PUBLICATIONS

Pilz, Techniques for Transmitting Subtitles for Television Programmes in Such a Way That Their Display is Optional, Aug. 1976, pp. 163-171.
Hawkins and Thomas, The Economic Preparation of Teletext Subtitles, Sep. 1980, pp. 89-92.

Primary Examiner—James J. Groody
Assistant Examiner—E. Anne Toth
Attorney, Agent, or Firm—Roberts, Spiecens & Cohen

[57] ABSTRACT

A superimposing apparatus comprises an obtaining circuit for obtaining a first positional information from a video signal including the first positional information, a comparing circuit for comparing a second positional information read out from a storage medium with the first positional information obtained in the obtaining circuit, a varying circuit for varying a read-out position on the storage medium according to a compared result in the comparing circuit so that the second positional information coincides with the first positional information, a character signal generating circuit for generating a character signal by reading out from the storage medium a character information corresponding to the second positional information when the first positional information and the second positional information coincide, and a mixed signal generating circuit for generating a mixed signal for a superimposed display by mixing to the video signal the character signal generated from the character signal generating circuit.

10 Claims, 10 Drawing Figures

SUPERIMPOSING APPARATUS

BACKGROUND OF THE INVENTION

The present invention generally relates to superimposing apparatuses, and more particularly to a superimposing apparatus which carries out a superimposed display by mixing a character signal to a video signal which includes a positional information.

Conventionally, there is a rotary recording medium (hereinafter simply referred to as a disc) which is recorded with an information signal such as a video signal, and a disc reproducing apparatus for reproducing the recorded information signal from the disc by use of a laser beam, for example.

When recording on the disc a program such as a movie which is in English, for example, it is necessary to superimpose sentences in a certain language if the disc is to be marketed in a region wherein a language other than English is used. Hence, the disc having the superimposed display of the sentences in the certain language must be manufactured for each of the regions wherein a different language is used. In other words, a plurality of kinds of discs must be manufactured with the superimposed display of the sentences in a plurality of languages which are used in the respective regions wherein the discs are to be marketed, although the discs are recorded with the same program. As a result, there is a problem in that the manufacturing cost of the disc becomes high due to the necessity to manufacture a plurality of kinds of discs recorded with the same program but having the superimposed display of the sentences in different languages.

SUMMARY OF THE INVENTION

Accordingly, it is a general object of the present invention to provide a novel and useful superimposing apparatus in which the problems described heretofore are eliminated.

Another and more specific object of the present invention is to provide a superimposing apparatus comprising obtaining means for obtaining a first positional information from a video signal including the first positional information, comparing means for comparing a second positional information read out from a storage medium with the first positional information obtained in the obtaining means, varying means for varying a read-out position on the storage medium according to a compared result in the comparing means so that the second positional information coincides with the first positional information, character signal generating means for generating a character signal by reading out from the storage medium a character information corresponding to the second positional information when the first positional information and the second positional information coincide, and a mixed signal generating means for generating a mixed signal for a superimposed display by mixing to the video signal the character signal generated from the character signal generating means. According to the superimposing apparatus of the present invention, it is possible to accurately read out from the storage medium and display characters corresponding to pictures.

Still another object of the present invention is to provide a superimposing apparatus in which the storage medium is interchangeable with another storage medium recorded with different second positional information and character information. According to the superimposing apparatus of the present invention, it is possible to carry out a superimposed display corresponding to the picture reproduced from the disc. In addition, one kind of disc can be used in regions wherein different languages are used, and the manufacturing cost of the disc can therefore be reduced.

A further object of the present invention is to provide a superimposing apparatus in which the character signal generating means is designed to supply the mixed signal generating means a character signal which is generated when the first positional information and the second positional information coincide continuously for a predetermined time period. According to the superimposing apparatus of the present invention, it is possible to prevent an erroneous superimposed display from being carried out even when an error occurs during a read-out of the first positional information of the video signal.

Another object of the present invention is to provide a superimposing apparatus in which the storage medium is recorded with a character information and a display time information in correspondence with the second positional information. According to the superimposing apparatus of the present invention, it is possible to maintain the superimposed display for a desired time.

Another object of the present invention is to provide a superimposing apparatus in which the character signal generating means comprises instructing means for instructing a position on the picture where the superimposed display is to be carried out, and the generated character signal is supplied to the mixed signal generating means only during a time period in which an instruction is made by the instructing means. According to the superimposing apparatus of the present invention, it is possible to carry out the superimposed display at a desired position on the picture according to the instruction.

Other objects and further features of the present invention will be apparent from the following detailed description when read in conjunction with the accompanying drawings.

DETAILED DESCRIPTION

Figure 1:
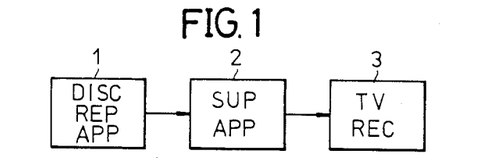
FIG. 1 is a block diagram generally showing the superimposing apparatus according to the present invention in use.

FIG. 1 generally shows the superimposing apparatus according to the present invention in use. A disc reproducing apparatus 1 plays a disc (not shown) which is recorded with a video signal including a positional information, and the video signal which is reproduced from the disc is supplied to a superimposing apparatus 2. The superimposing apparatus 2 generates a character signal corresponding to the positional information included in the reproduced video signal, and supplies to a television receiver 3 a mixed video signal which is obtained by mixing the character signal to the video signal. The television receiver 3 carries out a CRT display of the mixed video signal, and a picture having characters superimposed therewith is obtained.

Figure 2:
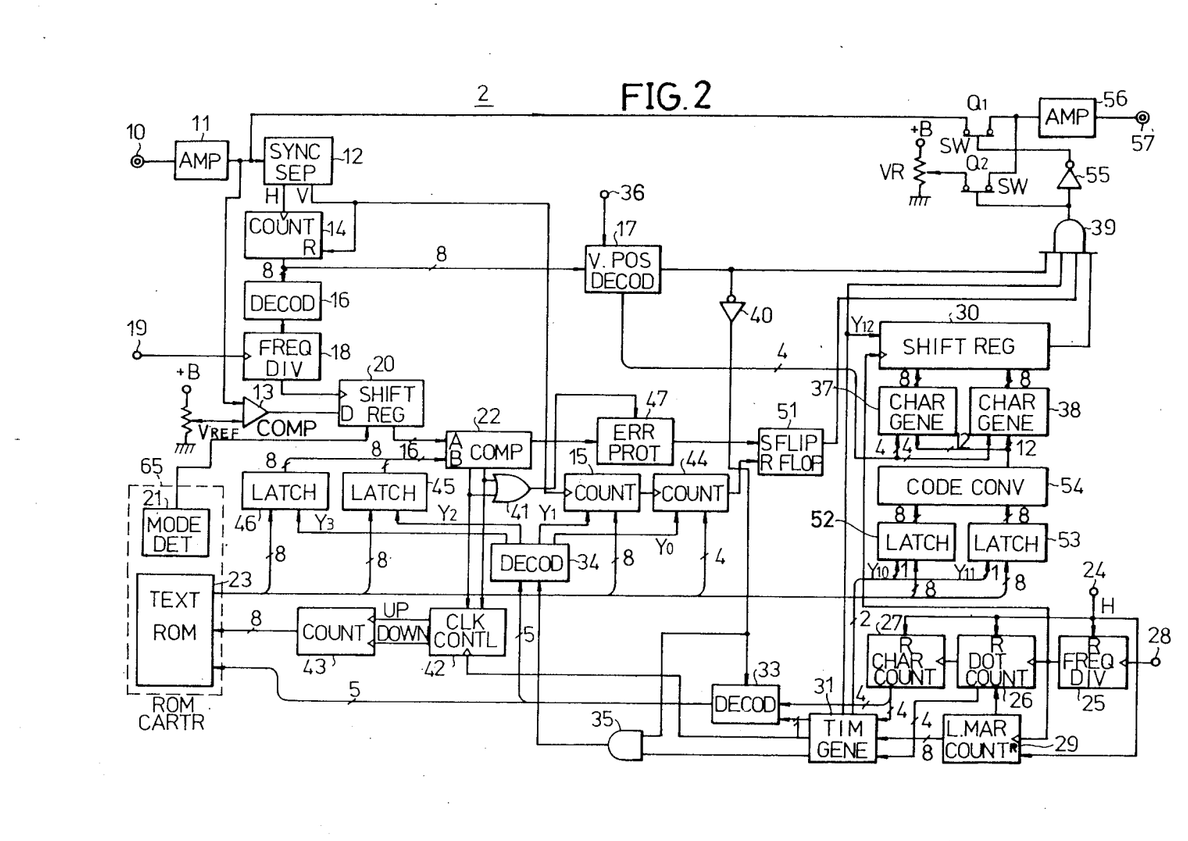
FIG. 2 is a system block diagram showing an embodiment of the superimposing apparatus according to the present invention.

FIG. 2 is a system block diagram showing an embodiment of the superimposing apparatus 2 according to the present invention. In FIG. 2, the video signal which is reproduced from the disc on the disc reproducing apparatus 1 is applied to a terminal 10.

The reproduced video signal is amplified in an amplifier 11 and is supplied to a synchronizing signal separating circuit 12, a comparator 13, and an analog switch Q1. The synchronizing signal separating circuit 12 separates vertical and horizontal synchronizing signals from the video signal, and supplies the vertical synchronizing signal to a reset terminal R of a counter 14 and a count terminal of a down counter 15. On the other hand, the horizontal synchronizing signal is supplied to a count terminal of the counter 14. The counter 14 is reset by the incoming vertical synchronizing signal and counts the horizontal synchronizing signal supplied thereafter. A counted value in the counter 14 is supplied to a decoder 16 and a vertical display position decoder 17. The decoder 16 detects the sixteenth horizontal synchronizing period (hereinafter simply referred to as the 16-th H) and the seventeenth horizontal synchronizing period (hereinafter simply referred to as the 17-th H) and supplies to a frequency divider 18 a high-level signal only when the 16-th H or the 17-th H is detected in the decoder 16. The frequency divider 18 frequency-divides a clock signal which is applied to a terminal 19 and has a frequency of 8 MHz by 1/16 only during a time period in which the high-level signal is obtained from the decoder 16, and generates a sampling clock signal having a frequency of 500 kHz. This sampling clock signal is supplied to a shift register 20.

Figure 3:
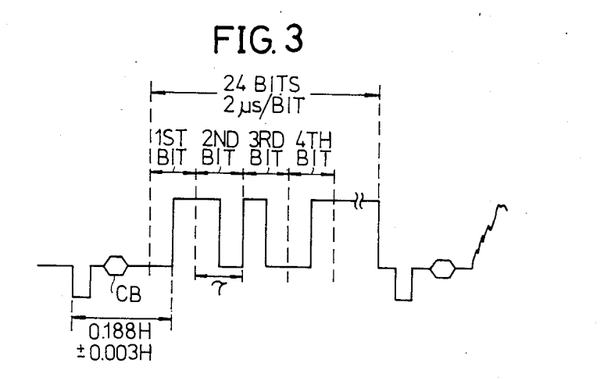
FIG. 3 shows a recording format of a positional information within a video signal.
Figure 4:
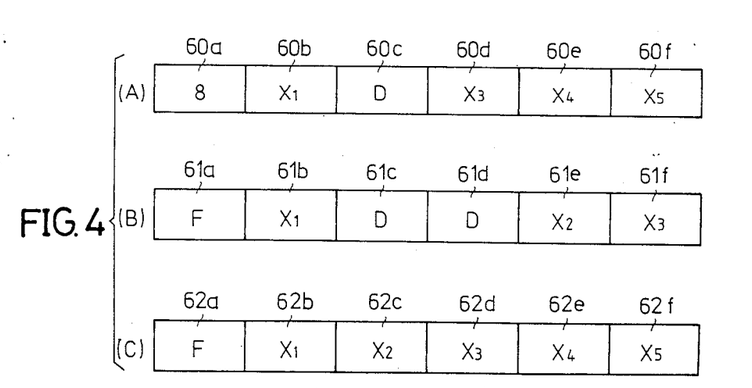
FIGS. 4(A) through 4(C) are diagrams for explaining the positional information within the video signal.

The disc is recorded either in a constant linear velocity (CLV) mode in which the information signal is recorded at a constant linear velocity or in a constant angular velocity (CAV) mode in which the information signal is recorded at a constant angular velocity. In the case of the disc recorded in the CLV mode, a 48-bit first positional information is recorded at the 16-th H and the 17-th H of the recorded video signal. The first positional information includes a time address which indicates a reproducing time from a start of a program on the disc, and the time address indicates a maximum of "1" hour, "00" minute, "00" second, and "00/30" second. The information signal is a digital signal shown in FIG. 3, for example. In FIG. 3, a 24-bit digital signal is recorded at a rate of one bit in two μsec after a color burst signal CB. A high level of the digital signal corresponds to a white peak level, and a low level of the digital signal corresponds to a pedestal level. The digital signal represents a "1" when a rising edge of a pulse is within a time period (bit cell) of two μsec, and represents a "0" when a falling edge of a pulse is within the time period of two μsec. In the case shown in FIG. 3, first through fourth bits of the digital signal represents "1001". The rise or fall in the first bit occurs 0.188H±0.003H after a fall in the horizontal synchronizing signal, where H represents one horizontal scanning period. As shown in FIG. 4(A), the 24-bit positional information of the 16-th H comprises 4-bit blocks 60a through 60f. The blocks 60a and 60c are discrimination blocks, and respectively have hexadecimal values "8" and "D". The block 60d indicates a tens digit of the seconds, and hexadecimal values "A" through "F" of the block 60b respectively correspond to the decimal values "0" through "5". The blocks 60d, 60e, and 60f respectively indicate a ones digit of the seconds, a tens digit of the 1/30 second, and a ones digit of the 1/30 second, and contain numerical values in a binary coded decimal (BCD) code. In addition, the 24-bit positional information of the 17-th H comprises 4-bit blocks 61a through 61f. The blocks 61a, 61c, and 61d are discrimination blocks, and respectively have hexadecimal values "F", "D", and "D". The block 61b indicates an hour, and the blocks 61e and 61f respectively indicate a tens digit and a ones digit of the minutes. The blocks 61b, 61e, and 61f contain numerical values in the BCD code.

On the other hand, in the case of the disc recorded in the CAV mode, a 24-bit first positional information is recorded at the 17-th H of the recorded video signal. The first positional information includes a sequential frame number which is numbered for each frame from a start of a program on the disc, and the frame number indicates a maximum of 79999 frames. The information signal is also a digital signal shown in FIG. 3, for example. As shown in FIG. 4(C), the 24-bit positional information comprises 4-bit blocks 62a through 62f. The block 62a is a discrimination block, and has a hexadecimal value "F". The blocks 62b through 62f respectively indicate a ten thousands digit, a thousands digit, a hundreds digit, a tens digit, and a ones digit of the frame number, and contain numerical values in the BCD code.

The comparator 13 is supplied with a predetermined reference voltage $V_{REF}$ which is greater than the pedestal level of the video signal. The comparator 13 discriminates whether the positional information (digital signal) recorded at the 16-th H and the 17-th H of the video signal has a high level or a low level, and supplies a discriminated result (that is, the discriminated high or low content of the positional information) to a data terminal D of the shift register 20. The shift register 20 successively samples and shifts the 48-bit positional information supplied from the comparator 13 responsive to the output sampling clock signal of the frequency divider 18. The shift register 20 is also supplied with a mode signal from a mode detector 21 which will be described later on in the specification. The mode signal has a low level when the disc is recorded in the CLV mode and has a high level when the disc is recorded in the CAV mode. In the case of the disc recorded in the CAV mode, the shift register 20 obtains a 16-bit positional information made up of each of the groups of four bits respectively representing the upper four digits of the frame number. In the case of the disc recorded in the CLV mode, the shift register 20 obtains a 16-bit positional information made up of each of the groups of four bits respectively representing the tens digit of the minutes, the ones digit of the minutes, the tens digit of the second, and the ones digit of the seconds of the time address. The 16-bit first positional information obtained from the shift register 20 is supplied to a terminal A of a comparator 22.

Figure 5:
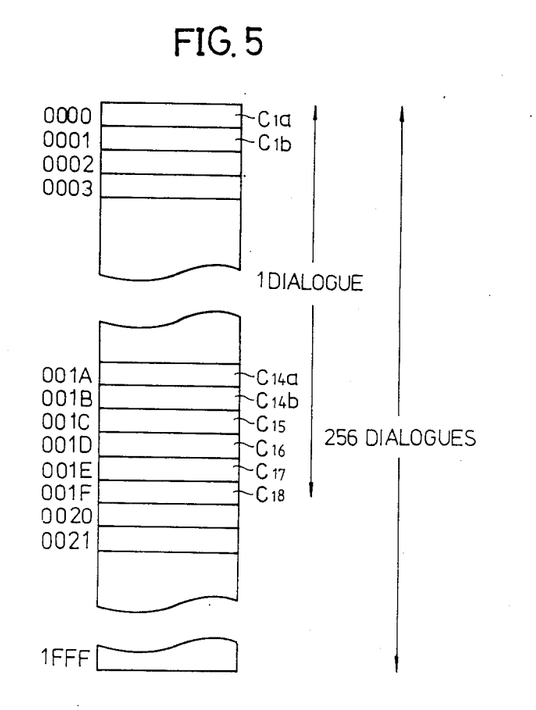
FIG. 5 is a diagram for explaining stored contents of a text ROM.

The mode detector 21 and a text ROM 23 are provided in a ROM cartridge 65. The text ROM 23 has a memory capacity of eight killobytes. As shown in FIG. 5, an address is assigned for every byte in the text ROM 23. A 16-bit character code is stored in bytes C1a and C1b which respectively store eight bits of the character code. Character codes corresponding to fourteen characters are stored in bytes C1a, C1b, . . . , C14a, and C14b. A display time in terms of 1/30 second is stored as a 16-bit code in bytes C15 and C16 with an upper four bits of the 16- bit code set to "0". In other words, the upper four bits of the byte C15 are set to "0". A second positional information is stored in bytes C17 and C18. In the case of the ROM cartridge 65 designed exclusively for the CAV mode, the positional information corresponding to the upper four digits of the frame number is stored in the bytes C17 and C18. On the other hand, in the case of the ROM cartridge 65 designed exclusively for the CLV mode, the positional information corresponding to the four digits, that is, the tens digit of the minutes, the ones digit of the minutes, the tens digit of the seconds, and the ones digit of the seconds are stored in the bytes C17 and C18. A phrase (one dialogue) amounting to one line is constituted by thirty-two bytes. Phrases amounting to 256 lines are stored in the text ROM 23.

Figure 6A:
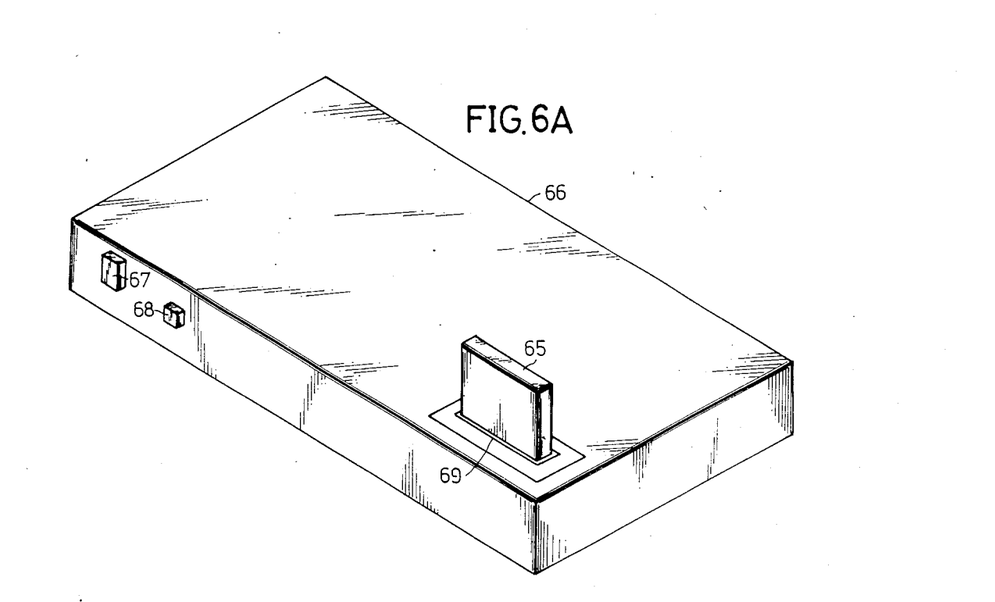
FIGS. 6A and 6B are an external perspective view and a cross sectional view respectively showing the superimposing apparatus shown in FIG. 2.
Figure 6B:
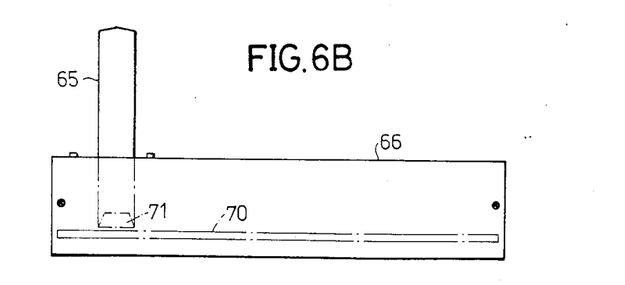

The superimposing apparatus shown in FIG. 2 is accommodated within a case 66 shown in FIG. 6A. A power source switch 67 and a display position changing switch 68 are provided on the case 66. An opening 69 is provided at an upper surface of the case 66. The ROM cartridge 65 is inserted into the opening 69 and is connected to a connector 61 which is arranged on a printed circuit board 70 within the case 66 as shown in FIG. 6B. Terminals of the ROM cartridge 65 connecting to the connector 71 include input and output terminals of the text ROM 23 within the ROM cartridge 65 for transferring address and data and a terminal of the mode detector 21. The signal level at the terminal of the mode detector 21 is high in the case of the ROM cartridge 65 designed exclusively for the CAV mode and is low in the case of the ROM cartridge 65 designed exclusively for the CLV mode.

Returning to the description of FIG. 2, it will be assumed for convenience' sake that the video signal applied to the terminal 10 is reproduced from the disc recorded in the CLV mode and that the ROM cartridge 65 (text ROM 23) is designed exclusively for the CLV mode.

The horizontal synchronizing signal from the synchronizing signal separating circuit 12 is also supplied to a terminal 24, and is hence supplied to respective reset terminals R of a frequency divider 25, a dot counter 26, a character counter 27, and a left margin counter 29 so as to reset the same. The frequency divider 25 frequency-divides a clock signal which is obained through a terminal 28 and has a frequency of 24 MHz by $\frac{1}{4}$ and generates a clock signal having a frequency of 6 MHz. This output clock signal of the frequency divider 25 is supplied to the dot counter 26, the left margin counter 29, and a shift register 30. A character which is superimposed with the picture is displayed by a sixteen by sixteen dot matrix, and one dot is displayed in one period of the 6 MHz clock signal. The dot counter 26 is a hexadecimal counter for counting the dots. The dot counter 26 supplies a 4-bit counted value to a timing generator 31 and supplies a carry signal to the character counter 27 when a high-level enable signal is obtained from the left margin counter 29. The left margin counter 29 determines a display start position of a character which is displayed at an upper left position in the picture. The left margin counter 29 counts the 6 MHz clock signal and supplies an 8-bit counted value to the timing generator 31, and supplies the high-level enable signal to the dot counter 26 when the counted value becomes greater than or equal to "56". Sixteen characters can be displayed in one line within the picture. The character counter 27 counts the carry signal from the dot counter 26 so as to determine the position (that is, one of first through sixteenth positions in one line) of the character which is to be displayed in one line. A 4-bit counted value of the character counter 27 is supplied to the timing generator 31 and a decoder 33. The decoder 33 uses the 4-bit signal from the character counter 27 and a 1-bit signal from the timing generator 31 to generate an address signal corresponding to lower five bits of the 13-bit address signal of the text ROM 23, and supplies the generated address signal to the text ROM 23 and a decoder 34. The timing generator 31 generates signals for instructing various timings, and one timing signal from the timing generator 31 is supplied to an AND circuit 35.

The vertical display position decoder 17 is supplied with the counted value from the counter 14 and an instruction signal which is obtained through a terminal 36. This instruction signal is an output of the display position changing switch 68. Hence, the vertical display position decoder 17 causes the superimposed character to be displayed at an uppermost or lowermost part of the picture according to a value of the instruction signal. When displaying the superimposed character at the lowermost part of the picture, the decoder 17 supplies to character generators 37 and 38 a 4-bit vertical position signal which has values "0" through "15" during a time period in which the counted value from the counter 14 is "220" to "236", for example, and also supplies to an AND circuit 39 and an inverter 40 a display instruction signal which assumes a high level only during the time period in which the counted value from the counter 14 is "220" to "236". The display instruction signal which is inverted in the inverter 40 is supplied to the AND circuit 35 and the decoder 33. The AND circuit 35 supplies the timing signal from the timing generator 31 to the decoder 34 only when no superimposed display is being made on the picture.

A clock signal generated from the timing generator 31 is supplied to a clock control circuit 42, and the clock control circuit 42 supplies the clock signal to an up clock terminal of an up-down counter 43 when a 2-bit control signal from the comparator 22 indicates that the positional information within the video signal is greater than the positional information read out from the text ROM 23. The clock control circuit 42 supplies the clock signal to a down clock terminal of the up-down counter 43 when the 2-bit control signal from the comparator 22 is smaller than the positional information within the video signal read out from the text ROM 23. The clock control circuit 42 stops generating the clock signal when the 2-bit control signal from the comparator 22 is equal to the positional information within the video signal read out from the text ROM 23. The up-down counter 43 counts up or down the clock signal and an 8-bit counted value is supplied to the text ROM 23 as an address signal corresponding to upper eight bits of the 13-bit address signal of the text ROM 23.

Figure 7:
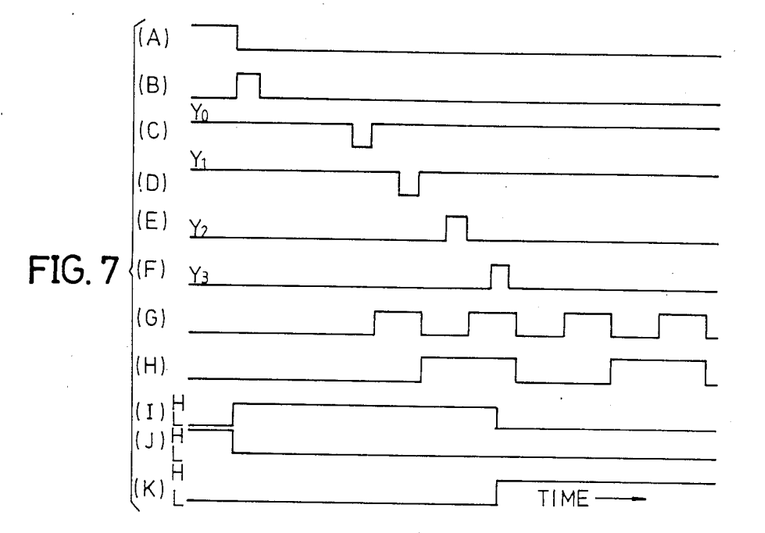
FIGS. 7(A) through 7(K) are time charts for explaining operations parts of the superimposing apparatus shown in FIG. 2.

When the ROM cartridge 65 is loaded, an access is made to the text ROM 23 by the address signals supplied from the up-down counter 43 and the decoder 33. While a high-level signal is supplied to the decoder 33 from the inverter 40, the decoder 33 generates a 5-bit address signal having upper three bits thereof set to "1", a least significant bit (LSB) of the 4-bit signal from the character counter 27 as a fourth bit thereof, and the signal from the timing generator as a fifth bit (that is, LSB) thereof. This 5-bit address signal from the decoder 33 is supplied to the text ROM 23. A clock signal shown in FIG. 7(B) which is in phase with a rising edge of the horizontal synchronizing signal shown in FIG. 7(A) is supplied to the clock control circuit 42. Thereafter, during a time period in which an access is made to the byte C15 of one dialogue in the text ROM 23 by the lower 5-bits of the address signal from the decoder 33, the decoder 34 supplies to a down counter 44 a latch signal Y0 shown in FIG. 7(C). The lower four bits of the byte C15 which has the upper four bits thereof set to "0" and is read out from the text ROM 23 are set in the down counter 44 responsive to a fall in the latch signal Y0. Next, during a time period in which the byte C16 is read out from the text ROM 23, the decoder 34 supplies to the down counter 15 a latch signal Y1 shown in FIG. 7(D), and the value of the byte C16 is set in the down counter 15 responsive to a fall in the latch signal Y1. Further, during time periods in which the bytes C17 and C18 are read out from the text ROM 23, the decoder 34 respectively supplies to latch circuits 45 and 46 latch signals Y2 and Y3 shown in FIGS. 7(E) and 7(F). The values of the bytes C17 and C18 are respectively set in the latch circuits 45 and 46 responsive to respective rises in the latch signals Y2 and Y3. FIGS. 7(G) and 7(H) respectively show waveforms of lower two bits of the 5-bit address signal generated from the decoder 33.

Accordingly, the 16-bit positional information read out from the text ROM 23 is latched by the latch circuits 45 and 46 in terms of eight bits, and the positional information is supplied to a terminal B of the comparator 22. The comparator 22 compares the positional information supplied to the terminals A and B thereof and generates a 2-bit control signal. A first bit of the 2-bit control signal assumes a high level as shown in FIG. 7(I) when the positional information from the shift register 20 is greater than the positional information originated from the text ROM 23. A second bit of the 2-bit control signal assumes a high level as shown in FIG. 7(J) only when the positional information originated from the text ROM 23 is greater than the positional information from the shift register 20. The 2-bit control signal generated from the comparator 22 is supplied to an OR circuit 41 and the clock control circuit 42. The comparator 22 also generates a signal shown in FIG. 7(K) which assumes a high level only when the two positional information coincide, and this signal is supplied to an error protect circuit 47.

Figure 8:
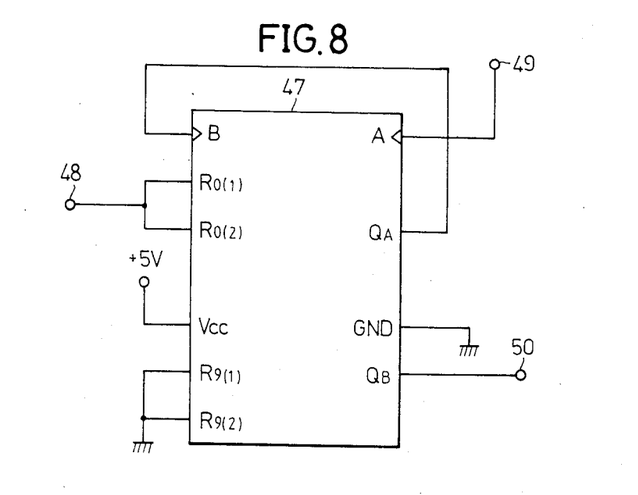
FIG. 8 is an embodiment of an integrated circuit constituting an error protect circuit of the superimposing apparatus shown in FIG. 2.

As shown in FIG. 8, the error protect circuit 47 is constituted by a semiconductor integrated circuit 74LS90 which is a counter circuit. In FIG. 8, an output signal of the OR circuit 41 is applied to a terminal 48 and is supplied to reset terminals $R_0(1)$ and $R_0(2)$ of respective first and second stages of the counter circuit. The output signal of the comparator 22 is applied to a terminal 49 and is supplied to an input terminal A in the first stage of the counter circuit. An output terminal $Q_A$ in the first stage of the counter circuit is connected to an input terminal B of the second stage of the counter circuit. An output terminal $Q_B$ of the second stage of the counter circuit is coupled to a set terminal S of a set-and-reset (SR) flip-flop 51 through a terminal 50. The error protect circuit 47 is cleared when a high-level signal is applied to the terminal 48, and sets the signal level at the terminals $Q_A$ and $Q_B$ to a low level. When a low-level signal is applied to the terminal 48, the error protect circuit 47 counts the pulses of the signal obtained through the terminal 49, and supplies a high-level signal through the terminal 50 only when the counted value becomes equal to "2". The first positional information of the video signal reproduced from the disc is recorded in the 16-th H and the 17-th H. Hence, when the first positional information and the second positional information coincide, the comparator 2 generates a pulse signal which has a high level in the first field of each frame and has a low level in the second field of each frame. The output pulse signal of the comparator 22 is supplied to the error protect circuit 47. Accordingly, the error protect circuit 47 supplies the high-level signal through the terminal 50 when the first positional information and the second positional information continuously coincide for the time period of two frames, and the flip-flop 51 is set by this high-level signal.

Therefore, even in the case where the first positional information within the video signal is read out erroneously due to a dropout and this erroneously read out first positional information by chance coincides with the second positional information from the text ROM 23, for example, the first positional information will no longer coincide with the second positional information one frame thereafter when the correct first positional information is obtained. As a result, the output signal level of the OR circuit 41 becomes high and the output signal level of the error protect circuit 47 accordingly becomes low. As a result, the flip-flop 51 is not set, and the superimposed display of an erroneous dialogue is prevented as will be described later.

Since the counted value in the up-down counter 43 goes up and down, the read-out address of the text ROM 23 is varied in such a direction that the position information obtained from the text ROM 23 coincides with the positional information within the video signal. When the two positional information coincide for the time period of four or more fields, the flip-flop 51 is set and an output signal level of the flip-flop 52 becomes high. The vertical synchronizing signal having the frequency of 30 Hz is applied to a clock terminal of the down counter 15, and the down counter 15 performs a down count for every 1/30 second. A borrow signal from the down counter 15 is supplied to the down counter 44 and is subjected to a down count. Hence, after the flip-flop 51 starts to generate the high-level signal and a 12-bit display time (in terms of 1/30 second) set by the text ROM 23 in the down counters 15 and 44 elapses, the output signal level of the flip-flop 51 becomes low. The output signal of the flip-flop 51 is supplied to the AND circuit 39.

Figure 9:
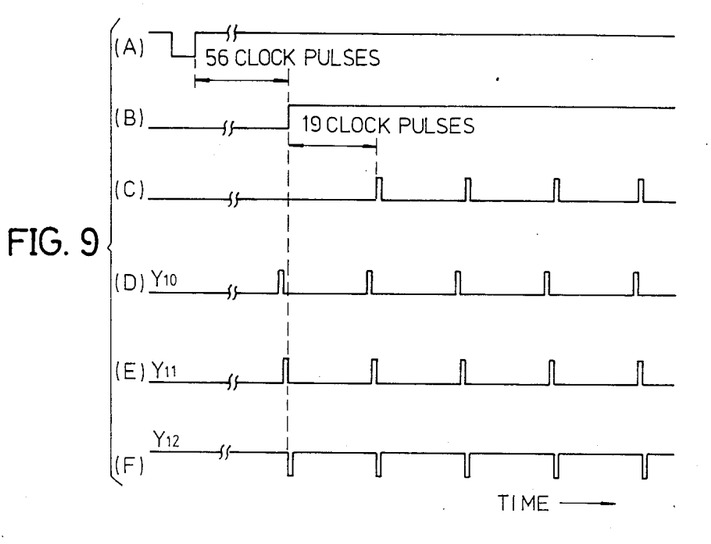
FIGS. 9(A) through 9(F) are time charts for explaining operations of other parts of the superimposing apparatus shown in FIG. 2.

Next, description will be given for the case where the output signal level of the flip-flop 51 is high. When the left margin counter 29 counts fifty-six pulses of the 6 MHz clock signal from a rise in the horizontal synchronizing signal shown in FIG. 9(A), the enable signal generated from the left margin counter 29 rises as shown in FIG. 9(B). Consequently, the dot counter 26 generates the carry signal shown in FIG. 9(C). The timing generator 31 generates latch signals Y10 and Y11 respectively shown in FIGS. 9(D) and 9(E), and supplies these latch signals Y10 and Y11 to respective latch circuits 52 and 53. The timing generator 31 also generates a load signal Y12 shown in FIG. 9(F) and supplies this load signal Y12 to the shift register 30 and the AND circuit 39.

While the low-level signal from the inverter 40 is supplied to the decoder 33, the decoder 33 generates a 5-bit address signal having the upper four bits thereof constituted by the 4-bit signal from the character counter 27 and the fifth bit (LSB) thereof constituted by the signal from the timing generator 31. This 5-bit address signal supplied to the text ROM 23. The LSB of the address signal supplied to the text ROM 23 increases by "1" from the first fall in the latch signal Y10 to the first rise in the latch signal Y11. As a result, the character code in the bytes C1a and C1b which are read out from the text ROM 23 is latched by the latch circuits 52 and 53. The 16-bit character code latched by the latch circuits 52 and 53 is converted into a 12-bit character code in a code converting circuit 54, and the 12-bit character code is supplied to the character generators 37 and 38. The character generators 37 and 38 generate the dot patterns corresponding to the right half and the left half of one character, respectively. The character generators 37 and 38 each generate an 8-bit signal. In other words, a 16-bit signal for indicating the sixteen dots on a line which is instructed by the vertical position signal from the vertical display position decoder 17 is generated by the two character generators 37 and 38, and this 16-bit signal is supplied in parallel to the shift register 30.

The shift register 30 loads the 16-bit signal from the character generators 37 and 38 during a low-level period of the load signal Y12, and thereafter performs a shift responsive to the clock signal obtained from the frequency divider 25. Thus, the 16-bit signal for display is produced serially from the shift register 30. The output signal of the shift register 30 is supplied to the AND circuit 39. The AND circuit 39 supplies the output signal of the shift register 30 to an analog switch Q2 and an inverter 55 when the load signal Y12 has a high level, the output signal level of the flip-flop 51 is high, and the display instruction signal from the vertical display position decoder 17 has a high level.

When the signal for display is not obtained from the AND circuit 39 or when the signal for display obtained from the AND circuit 39 has a low level, the analog switch Q1 is turned ON by an output signal of the inverter 55 and the video signal from the terminal 10 is supplied to an amplifier 56 via the analog switch Q1. When the level of the signal for display obtained from the AND circuit 39 becomes high, the analog switch Q1 is turned OFF and the analog switch Q2 is turned ON. As a result, A voltage from a variable resistor VR is supplied to the amplifier 56 as a luminance signal. The amplifier 56 amplifies the video signal which is mixed with a signal depending on the switching of the analog switches Q1 and Q2, and the output video signal of the amplifier 56 is obtained through an output terminal 57.

Similarly, every time the counted value in the character counter 27 increases, the bytes C2a, C2b, ..., C14a, and C14b are successively latched by the respective latch circuits 52 and 53, and the signal for display corresponding to a maximum of fourteen characters in one line is obtained from the shift register 30. Such an operation is repeated, and the operation of carrying out the superimposed display on the picture is completed. The operation of carrying out the superimposed display is continued until the output signal level of the flip-flop 51 becomes low.

In this manner, a signal indicating characters of a sentence or the like corresponding to the content of the video signal is mixed with the video signal from the terminal 10 and is obtained through the terminal 57.

The ROM cartridge 65 shown in FIGS. 6A and 6B are interchangeable. Hence, even when the disc to be played is changed to a different disc, it is possible to carry out the superimposed display corresponding to the picture reproduced from the different disc by changing the ROM cartridge 65 to a ROM cartridge corresponding to the different disc. In addition, by using the character generators 37 and 38 which are stored with character codes of different languages corresponding to a movie which is in English, for example, it is possible to enjoy one kind of disc in a plurality of regions wherein the different languages are used.

The recording format of the positional information in the video signal obtained from the terminal 10 is not limited to that of the embodiment described heretofore. When a different recording format is used for the positional information, it is sufficient to perform slight modifications in the decoder 16, the frequency divider 18, the shift register 20, and the bytes C17 and C18 of the text ROM 23. Moreover, the video signal applied to the terminal 10 is not limited to a video signal which is reproduced from the disc. In other words, the video signal is not limited to that used in the embodiment described heretofore, and the superimposed display can be carried out as long as the video signal has the positional information. Hence, the video signal applied to the terminal 10 may be a video signal reproduced from a recording medium on a video tape recorder or the like, for example.

Further, the present invention is not limited to these embodiments, but various variations and modifications may be made without departing from the scope of the present invention.

What is claimed is:

1. A superimposing apparatus comprising:
   obtaining means for obtaining a first positional information from a video signal including the first positional information;
   comparing means for comparing a second positioal information read out from a storage medium with the first positional information obtained in said obtaining means;
   varying means for varying a read-out position on the storage medium according to a compared result in said comparing means so that the second positional information coincides with the first positional information;
   character signal generating means for generating a character signal for reading out from the storage medium a character information corresponding to the second positional information when the first positional information and the second positional information coincide; and
   a mixed signal generating means for generating a mixed signal for a superimposed display by mixing to the video signal the character signal generated from said character signal generating means.

2. A superimposing apparatus as claimed in claim 1 in which said storage medium is interchangeable with another storage medium recorded with different second positional information and character information.

3. A superimposing apparatus as claimed in claim 1 in which said first positional information is recorded at a predetermined position in a vertical synchronizing signal of the video signal, said obtaining means obtaining said first positional information by using as a reference a vertical synchronizing signal separated from the video signal.

4. A superimposing apparatus as claimed in claim 1 in which said obtaining means subjects the first positional information which is obtained serially to a serial-to-parallel conversion and supplies the first positional information to said comparing means in parallel.

5. A superimposing apparatus as claimed in claim 1 in which said video signal is reproduced from a rotary recording medium.

6. A superimposing apparatus as claimed in claim 1 in which said character signal generating means supplies to said mixed signal generating means a character signal which is generated when the first positional information and the second positional information coincide continuously for a predetermined time period.

7. A superimposing apparatus as claimed in claim 1 in which said storage medium is recorded with a character information and a display time information in correspondence with the second positional information.

8. A superimposing apparatus as claimed in claim 7 in which said character signal generating means supplies the generated character signal to said mixed signal generating means only for a time period instructed by said display time information after the first positional information coincides with the second positional information.

9. A superimposing apparatus as claimed in claim 1 in which said character signal generating means comprises instructing means for instructing a position on a picture where a superimposed display is to be carried out, the generated character signal being supplied to said mixed signal generating means only during a time period in which an instruction is made by said instructing means.

10. A superimposing apparatus as claimed in claim 1 in which said mixed signal generating means time-division-multiplexes said video signal and said character signal.

* * * * *